United States Patent
Davis et al.

(10) Patent No.: US 11,316,365 B2
(45) Date of Patent: *Apr. 26, 2022

(54) MODULAR UNINTERRUPTIBLE POWER SUPPLY AND POWER DISTRIBUTION SYSTEM

(71) Applicant: Eaton Intelligent Power Limited, Dublin (IE)

(72) Inventors: Scott Jason Davis, Youngsville, NC (US); Thomas Joseph Overberg, Apex, NC (US); David G. Windsor, Raleigh, NC (US); Stefan Ashley Coote, St. Martin d'Uriage (FR)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/121,390

(22) Filed: Dec. 14, 2020

(65) Prior Publication Data

US 2021/0210975 A1 Jul. 8, 2021

Related U.S. Application Data

(63) Continuation of application No. 15/535,993, filed as application No. PCT/US2015/065664 on Dec. 15, 2015, now Pat. No. 10,868,438.

(Continued)

(51) Int. Cl.
*H02J 9/06* (2006.01)
*H02J 3/00* (2006.01)
(Continued)

(52) U.S. Cl.
CPC ............ *H02J 9/06* (2013.01); *G06F 1/266* (2013.01); *G06F 1/3206* (2013.01);
(Continued)

(58) Field of Classification Search
CPC ...... G06F 1/266; G06F 1/3206; G06F 13/362; H01R 13/64; H02J 3/0073; H02J 9/06;
(Continued)

(56) References Cited

U.S. PATENT DOCUMENTS 10,868,438 B2 * 12/2020 Davis .................... G06F 1/3206
2003/0126253 A1 7/2003 Ewing et al.
(Continued)

OTHER PUBLICATIONS

Notification Concerning Transmittal of International Preliminary Report on Patentability, PCT/US2015/065664, dated Jun. 20, 2017, 8 pages.

(Continued)

*Primary Examiner* — Toan T Vu
(74) *Attorney, Agent, or Firm* — Stanek Lemon Crouse & Meeks, P.A.

(57) ABSTRACT

A system includes a converter unit and a power distribution unit (PDU) having at least one power outlet, a first power port configured to be coupled to an AC power source and second power port coupled to the converter unit. The PDU is further configured to selectively provide power to the at least one outlet from the first and second power ports. The PDU may include a power strip with an elongate enclosure and a plurality of receptacles at a face of the enclosure, and the converter may include a rack mountable converter unit coupled to the power strip by a power cable and a communications cable. The rack mountable converter unit may include an inverter and a battery.

11 Claims, 3 Drawing Sheets

Related U.S. Application Data

(60) Provisional application No. 62/091,876, filed on Dec. 15, 2014.

(51) Int. Cl.
*G06F 1/26* (2006.01)
*G06F 1/3206* (2019.01)
*G06F 13/362* (2006.01)
*H01R 13/64* (2006.01)

(52) U.S. Cl.
CPC .......... *G06F 13/362* (2013.01); *H01R 13/64* (2013.01); *H02J 3/0073* (2020.01); *Y02D 10/00* (2018.01)

(58) Field of Classification Search
CPC .......... H02J 9/061; H02J 9/068; Y02D 10/14; Y02D 10/00; Y02B 90/20; Y04S 20/00
See application file for complete search history.

(56) References Cited

U.S. PATENT DOCUMENTS

| | | | |
|---|---|---|---|
| 2007/0291430 A1 | 12/2007 | Spitaels et al. | |
| 2010/0110731 A1* | 5/2010 | Murai | H02J 9/062 363/15 |
| 2012/0319485 A1* | 12/2012 | Ewing | H02J 9/06 307/64 |
| 2014/0017528 A1 | 1/2014 | Uehara | H01M 10/4207 429/61 |
| 2014/0277810 A1 | 9/2014 | Costa | G06F 1/263 700/297 |
| 2016/0109916 A1* | 4/2016 | Li | H02J 7/35 700/295 |

OTHER PUBLICATIONS

International Search Report and Written Opinion, PCT/US2015/065664, dated Mar. 3, 2016, 9 pages.

* cited by examiner

MODULAR UNINTERRUPTIBLE POWER SUPPLY AND POWER DISTRIBUTION SYSTEM

RELATED APPLICATION DATA

The present application is a continuation of U.S. patent application Ser. No. 15/535,993, filed Jun. 14, 2017 which is a U.S. National Stage Application of PCT Application No. PCT/US2015/065664, filed Dec. 15, 2015, which claims priority from and the benefit of U.S. Provisional Patent Application No. 62/091,876, filed Dec. 15, 2014, the disclosures of which are hereby incorporated herein by reference in their entireties.

BACKGROUND

The inventive subject matter relates to power supply systems and, more particularly, to uninterruptible power supply systems.

Uninterruptible power supplies (UPSs) are commonly used to provide redundant power for computers and other electronic equipment. In some applications, for example, an equipment rack used in a data center may have a UPS mounted therein. The UPS may be configured to receive power from a primary source, such as a utility source, and a backup source, such as a battery, and may selectively provide power at its power output from the two input sources. The power output of the UPS may be coupled to a power strip-type power distribution unit (PDU) attached to the rack. Computers and other electronic equipment mounted in the rack may be plugged into power outlets of the PDU, and thus provided with uninterruptible power.

SUMMARY OF THE INVENTION

According to some embodiments, a system includes a converter unit and a power distribution unit (PDU) having at least one power outlet, a first power port configured to be coupled to an AC power source and second power port coupled to the converter unit. The PDU is further configured to selectively provide power to the at least one outlet from the first and second power ports.

In some embodiments, the PDU may include an internal power bus coupled to the at least one outlet, a first switch configured to couple and decouple the internal power bus and the first power port, a second switch configured to couple and decouple the internal power bus and the second power port, and a control circuit configured to control the first and second switches. The control circuit of the PDU may be configured to control the first and second switches to selectively provide power to the at least one outlet from the first and second power ports.

In some embodiments, the PDU may include a power strip with an elongate enclosure and a plurality of receptacles at a face of the enclosure. The converter may include a rack mountable converter unit coupled to the power strip by a power cable and a communications cable. The rack mountable converter unit may include an inverter and a battery.

Further embodiments provide a PDU including an internal power bus, a first power port configured to be coupled to an external power source, at least one power outlet configured to be coupled to the internal power bus, a first switch configured to couple and decouple the internal power bus and the first power port, a second power port configured to be coupled to a converter unit, a second switch configured to couple and decouple the internal power bus and the second power port, and a control circuit configured to control the first and second switches and to communicate with a control circuit of the converter unit. The control circuit of the PDU may be configured to control the first and second switches to selectively provide power to the at least one outlet from the external power source and the converter unit. The PDU may include a power strip with an elongate enclosure and a plurality of receptacles at a face of the enclosure and may be configured to be coupled to the converter unit by a power cable and a communications cable.

Further embodiments provide a system including a rack mountable converter unit and a PDU having an elongate housing and including a plurality of power outlets, a first power port configured to be coupled to an AC power source and second power port coupled to the converter unit. The PDU is further configured to selectively provide power to the plurality of power outlets from the first and second power ports.

DETAILED DESCRIPTION

Figure 1:
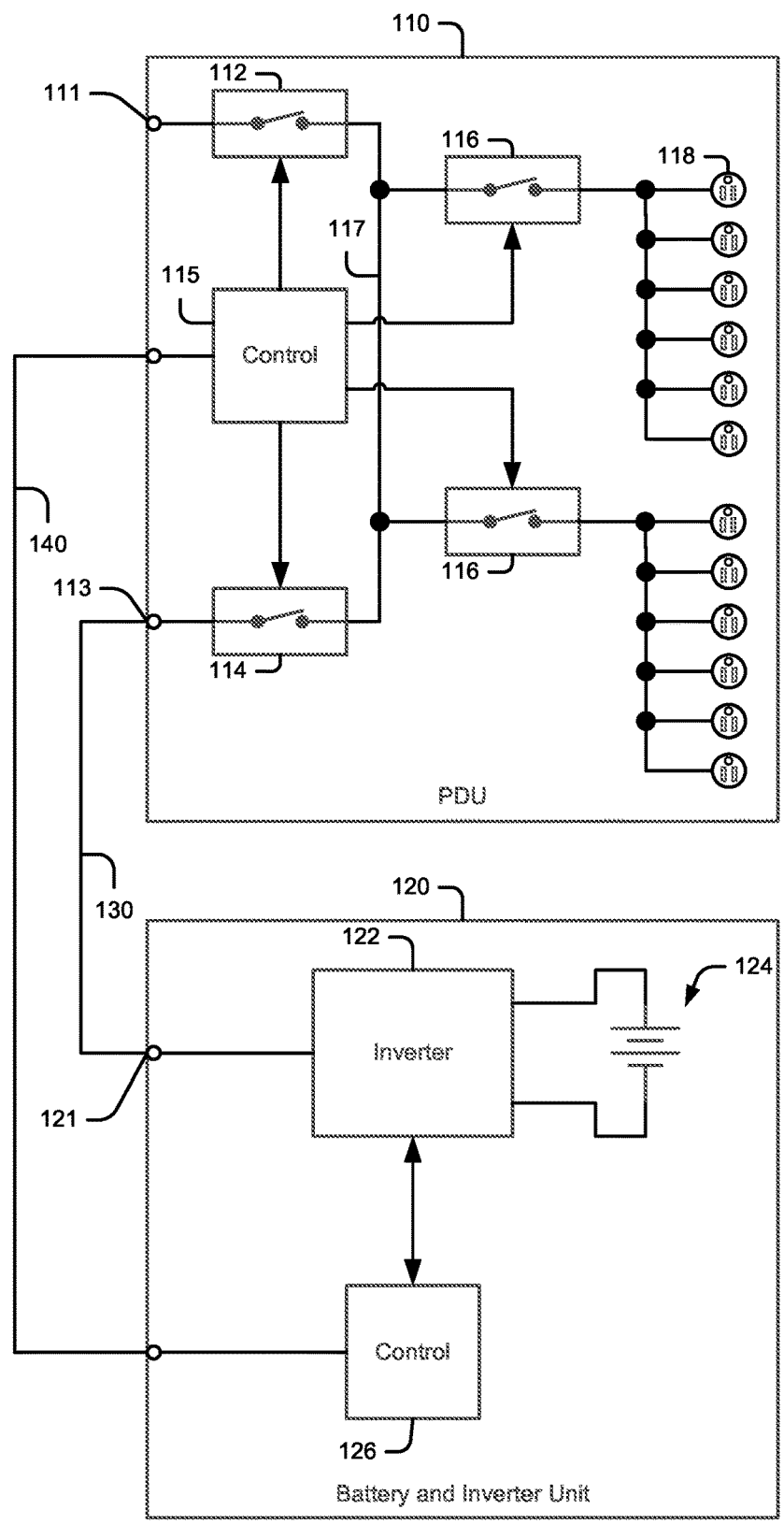
FIG. 1 is a schematic diagram of a system according to some embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a modular uninterruptible power supply (UPS) and power distribution system according to some embodiments of the inventive subject matter. The system includes a power distribution unit (PDU) 110, which is configured to be coupled to a power converter unit, here shown as a battery and inverter unit 120, by a power link 130 (e.g., a power cable) and a communications link 140 (e.g., an Ethernet cable). The PDU 110 includes a plurality of power outlets, here shown as conventional plug-in receptacles 118. It will be appreciated, however, the power outlets may take any of a variety of different forms, including, but not limited to, receptacles, terminal blocks, output cords, and the like.

As further shown, the PDU 110 includes a first power port 111 configured to be coupled to an external power source (e.g., a power distribution system) and a second power port 113 configured to be coupled to the battery and inverter unit 120 by the power link 130. The PDU 110 further includes a first switch 112, which is configured to selectively connect the first power port 111 to an internal power bus 117, and a second switch 114, which is configured to couple the second power port 113 to the internal power bus 117. The first and second switches 114, 114 may be, for example, contactors, relays or semiconductor switches providing similar functionality. A control circuit 115 is configured to control the first and second switches 112, 114. Respective groups of the outlets 118 are configured to be coupled to internal power bus 117 by respective switches 116, which may also be controlled by the control circuit 115.

The battery and inverter unit 120 includes a power port 121 which is configured to be coupled to the second power port 113 of the PDU 110. An inverter circuit 122 is coupled to the power port 121 and to a battery 124. A control circuit 126 is configured to control the inverter circuit 122 and to communicate with the control circuit 115 of the PDU 110 via the communications link 140. The inverter circuit 122 and the battery 124 may be positioned in a common enclosure or other integrated assembly, or may be included in separate electrically interconnected assemblies.

The control circuit 115 of the PDU 110 and the control circuit 126 of the battery and inverter unit 120 are configured to control the components of the PDU 110 and the battery and inverter unit 120 to provide uninterruptible power supply operations for loads coupled to the receptacles 118. In particular, in response to a failure of the external power source coupled to the first power port 111, the control circuit 115 of the PDU 110 may close the second switch 113 to couple the inverter circuit 122 to the internal power bus 117 of the PDU 110, so that the inverter circuit 122 of the inverter and battery module 120 may provide power to the outlets 118 from the battery 124. When powering the receptacles 118 from the inverter circuit 122, the control circuit 115 of the PDU 110 may open the first switch 112 to prevent backfeed to the external power distribution system coupled to the first power port of the PDU 110. The control circuit 115 of the PDU 110 may be further configured to close the second switch 114 during normal operation (e.g., when the external power source coupled to the first power port 111 is present and the first switch 112 is closed) to enable the inverter circuit 122 to charge the battery 124. The battery and inverter unit 120 may also be configured to be hot-swappable, e.g., the second switch 114 of the PDU 110 may be used to isolate the load from the battery and inverter unit 120 to allow replacement without affecting operation of the load. The control circuits 115, 126 may be configured to communicate with one another via the communications link 140 to support such operations.

Figure 2:
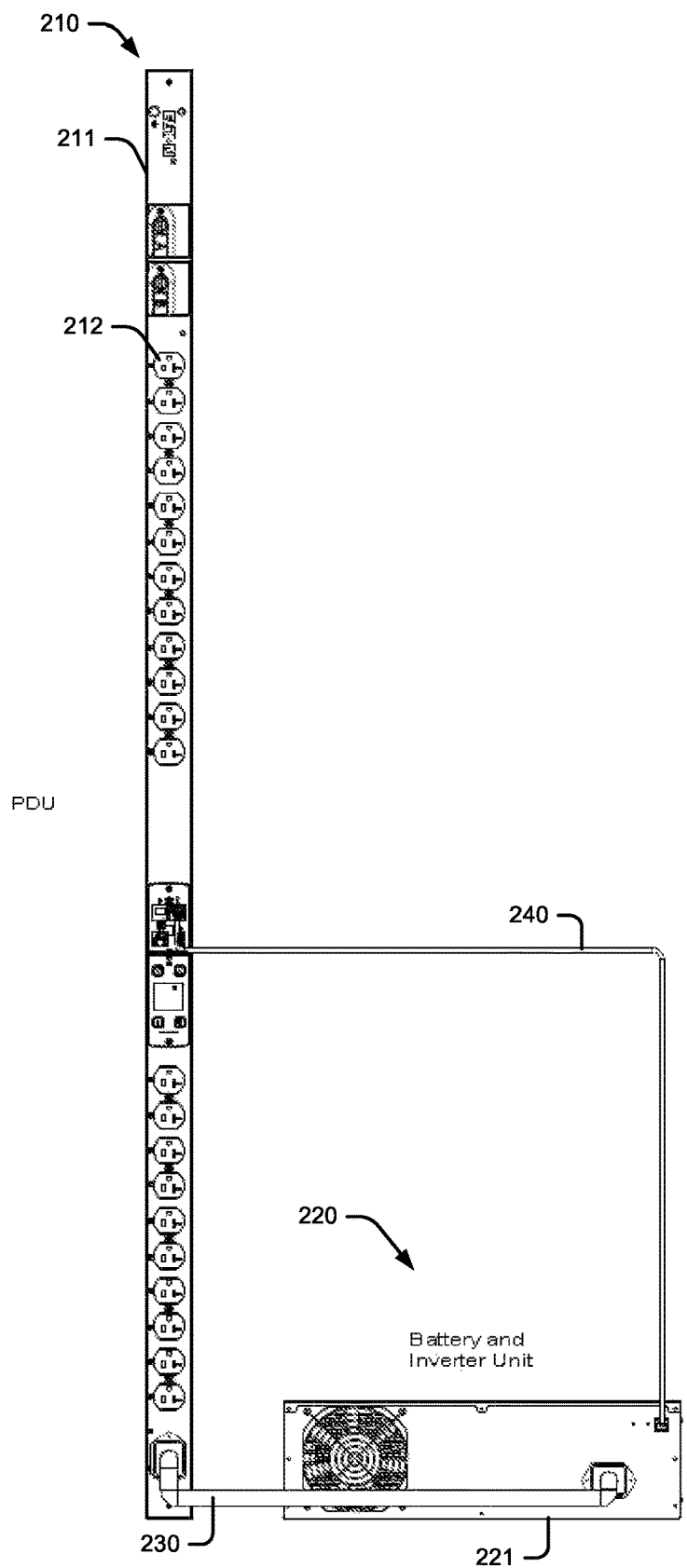
FIG. 2 is a front view of a system according to further embodiments.
Figure 3:
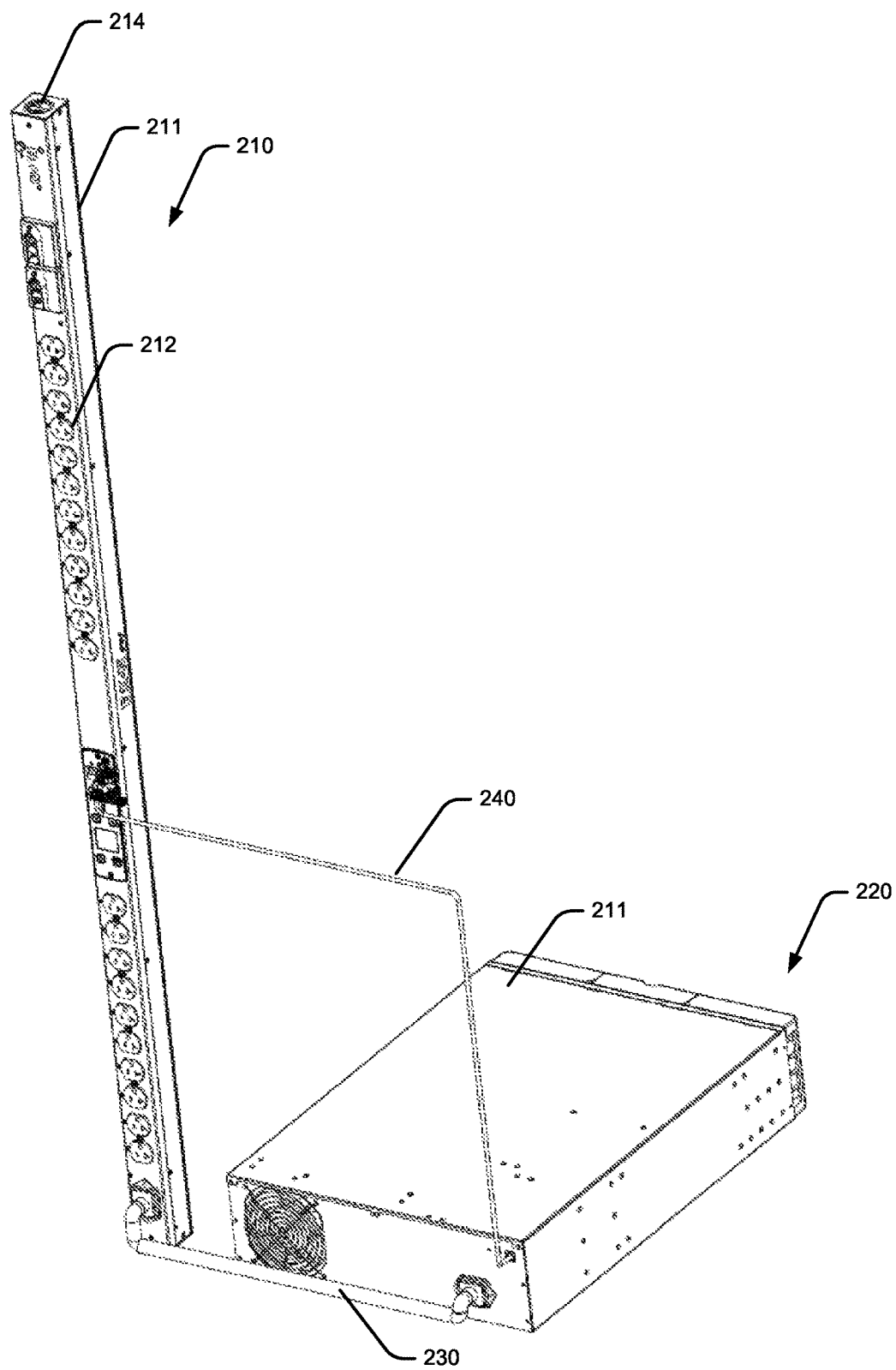
FIG. 3 is a perspective view of the system of FIG. 2.

Some embodiments of the inventive subject may be advantageously employed in data center applications. FIGS. 2 and 3 illustrate a PDU 210 and a battery and inverter unit 220 that are configured to be mounted in an equipment rack, such as equipment racks commonly used in data centers to house servers and other data processing and communications equipment. As shown, the PDU 210 is configured as a power strip with an elongate enclosure 211 that is configured to be mounted vertically in a rack, and includes a plurality of receptacles 212 to which power cords of rack-mounted equipment may be connected. The battery and inverter unit 220 is configured as a rackmount module having a housing 221 configured to mount horizontally in the rack in a manner similar to server modules or other rackmount equipment.

The PDU 210 and the battery and inverter module 221 are coupled by a power cable 230 and a communications cable 240. The power cable 230 may be fixedly connected to one or both of the PDU 210 and the battery and inverter unit 220, or may pluggably connect to one or both of the units. The PDU may receive external power at a power cable input 214, which may include, for example, a knockout and wiring space for connection of conduit or cable wiring or a socket configured to mate with a connector of an input power cord. The communications cable 240 may be fixedly connected to the PDU 210 and/or the battery and inverter module 220, or may be pluggably connected to one or bother of the units using connectors, such as RJ45 Ethernet connectors. The PDU 210 and the battery and inverter unit 220 may include electrical circuitry along the lines of the PDU 110 and the battery and inverter unit 120 of FIG. 1, respectively, and may have similar functionality.

Embodiments of the inventive subject matter may provide several advantageous features. A system as described above with reference to FIGS. 1-3 may provide premium, efficient power protection in a relatively small footprint while providing a high degree of functionality and reliability for data centers. Such systems may be used to provide an N+1 redundancy in systems where the external power source coupled to the system is already protected by a UPS, and may be selectively deployed in multi-tenant data centers in which different tenants require different levels of power security.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

What is claimed is:

1. A system comprising:
   a rack mountable converter unit; and
   a power strip comprising:
      a first power port configured to be coupled to an AC power source;
      a second power port configured to be coupled to the converter unit via a power cable;
      a plurality of receptacles; and
      a switching circuit configured to selectively couple the first power port and the second power port to the plurality of receptacles, wherein the converter unit and the power strip are configured to communicate with one another to coordinate operations of a power converter of the converter unit and the switching circuit of the power strip.

2. The system of claim 1, wherein the converter unit comprises a first control circuit, wherein the power strip comprises a second control circuit, wherein the first control circuit is configured to communicate with the second control circuit and to responsively control the power converter of the converter unit, and wherein the second control circuit is configured to communicate with the first control circuit and to responsively control the switching circuit.

3. The system of claim 2, wherein the first control circuit and the second control circuit are configured to be coupled by a communications cable.

4. The system of claim 2, wherein the power strip comprises:
   a power bus coupled to the plurality of receptacles;
   a first switch configured to couple and decouple the power bus and the first power port; and
   a second switch configured to couple and decouple the power bus and the second power port,
   wherein the second control circuit is configured to control the first and second switches.

5. The system of claim 4, wherein the first and second control circuits are configured to provide a first mode of operation wherein the first switch is closed to provide power from the AC power source to the power bus and a second mode of operation wherein the second switch is closed to provide power from the power converter of the converter unit to the power bus.

6. The system of claim 5, wherein the converter unit further comprises a battery coupled to the power converter and wherein the first control circuit and the second control circuit are configured to close the second switch and operate the power converter to charge the battery in the first mode of operation.

7. The system of claim 1, wherein the converter unit further comprises a battery coupled to the power converter.

8. A power strip comprising:
   a first power port configured to be coupled to an AC power source;
   a second power port configured to be coupled to an inverter of a rack-mounted converter unit via a power cable;
   a plurality of receptacles;
   a switching circuit configured to selectively couple the first power port and the second power port to the plurality of receptacles; and
   a control circuit configured to communicate with the converter unit and to responsively control the switching circuit.

9. The power strip of claim 8, wherein the control circuit is configured to be coupled to the converter unit by a communications cable.

10. The power strip of claim 8, wherein the switching circuit comprises:
    an internal power bus coupled to the plurality of receptacles;
    a first switch configured to couple and decouple the internal power bus and the first power port; and
    a second switch configured to couple and decouple the internal power bus and the second power port,
    wherein the control circuit is configured to control the first and second switches.

11. The power strip of claim 10, wherein the control circuit is configured to provide a first mode of operation wherein the first switch is closed to provide power from the AC power source to the internal power bus and a second mode of operation wherein the second switch is closed to provide power from the convert unit to the internal power bus.

* * * * *